United States Patent [19]

Hale

[11] Patent Number: 4,717,606
[45] Date of Patent: Jan. 5, 1988

[54] METHOD OF FABRICATING A THIN FILM ELECTROLUMINESCENT DISPLAY PANEL

[75] Inventor: Leonard G. Hale, Newbury Park, Calif.

[73] Assignee: Rockwell International Corporation, El Segundo, Calif.

[21] Appl. No.: 865,498

[22] Filed: May 21, 1986

[51] Int. Cl.$^4$ .................. C09K 19/00; B32B 9/00; H01J 1/62; 428 1; 428 690; 428 917; 313 503; 313 506

[52] U.S. Cl. ................................................ 428/1

[58] Field of Search .................. 428/1, 690, 917; 313/503, 506

[56] References Cited

U.S. PATENT DOCUMENTS

| | | |
|---|---|---|
| 3,566,391 | 2/1971 | Lally ................................. 313/506 |
| 4,376,145 | 3/1983 | Frame ................................. 428/195 |
| 4,422,377 | 4/1984 | Histon et al. ........................ 313/503 |
| 4,622,272 | 11/1986 | Wengert et al. .................... 428/690 |

FOREIGN PATENT DOCUMENTS 1543233  3/1979  United Kingdom ............... 428/917

*Primary Examiner*—John E. Kittle
*Assistant Examiner*—Patrick J. Ryan
*Attorney, Agent, or Firm*—H. Fredrick Hamann; Craig O. Malin

[57] ABSTRACT

A thin film electroluminescent display panel is fabricated by using ion implantation at selected locations in a host layer. By this method, strips of electroluminescent material with different dopants can be created, and these different stripes can be addressed by separate electrodes in order to obtain a multicolor display panel.

15 Claims, 4 Drawing Figures

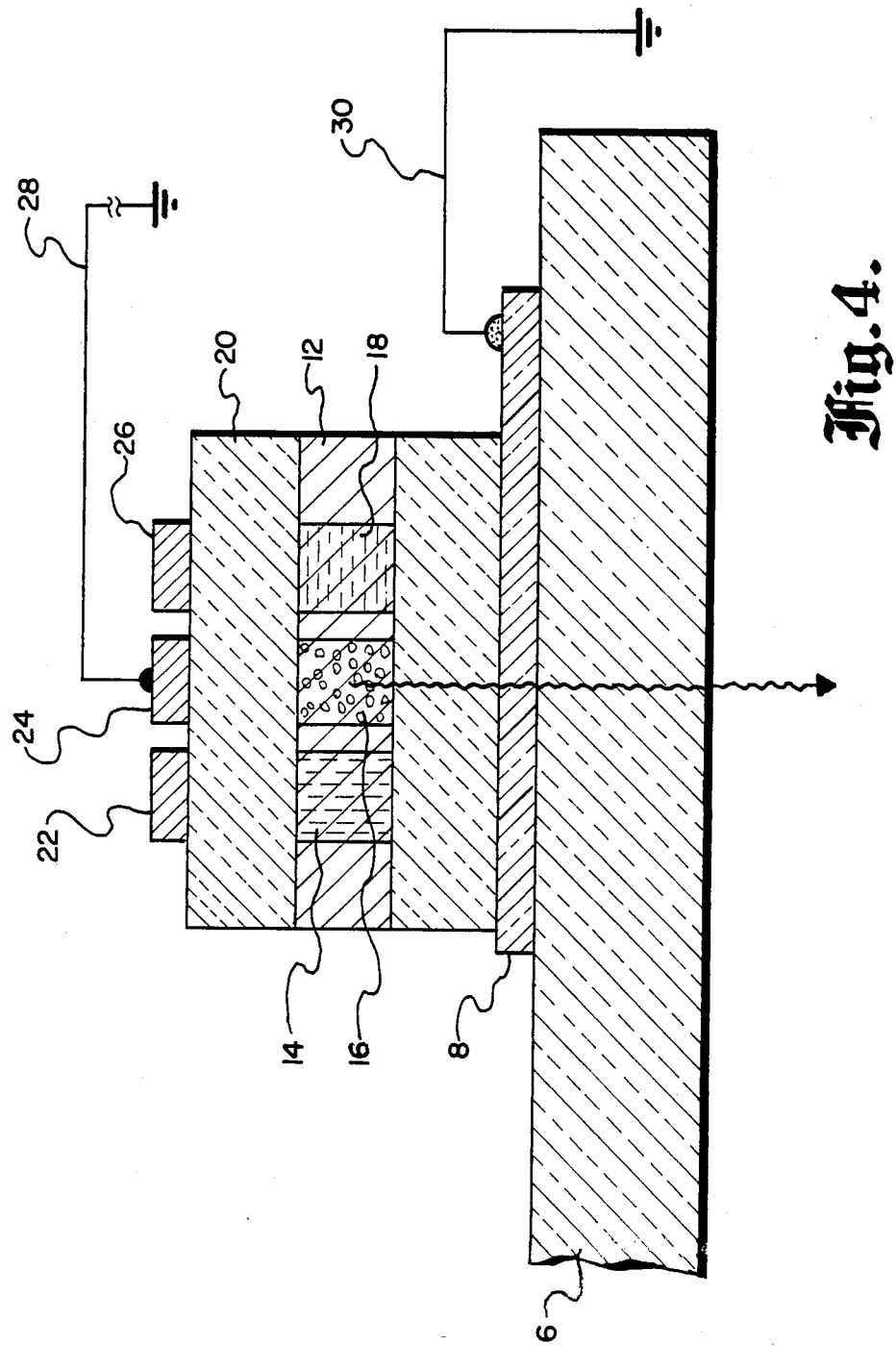

METHOD OF FABRICATING A THIN FILM ELECTROLUMINESCENT DISPLAY PANEL

BACKGROUND OF THE INVENTION

This invention relates to display devices, and particularly to thin film electroluminescent display panels.

Light emitting display devices have been fabricated utilizing the electroluminescent effect obtained by exposing special light-emitting materials (sometimes called phosphors) to an electrical field (see, for example, U.S. Pat. No. 4,342,945).

Phosphors have been found which give off different colors, and attempts have been made to use several phosphors to make a multicolor display. A common approach has been to stack layers of different phosphors to obtain several colors (for example, R. E. Coovert, et al., "Feasibility of a Dual-Color ACTFEL Display, SID Dig., 1982, pp. 128–129). In a paper by A. H. Kitai and G. J. Wolga, it was suggested that multicolor devices might be provided by using spatially-modulated activator doping by means of laser photochemical vapor deposition ("Two-Color Thin-Film Electroluminescence with Spatially-Selective Activator Doping", SID 83 Digest, pp. 138–139). Other investigators have shown that ZnS could be implanted with Mn ions to make electroluminescent films. However, the overall surface was implanted rather than discrete locations on the film (A. J. Warren, et al, "A Study of the Luminescent and Electrical Characteristics of Films of ZnS Doped with Mn", Journal of Luminescence 28 (1983), pp. 147–162 and A. J. Warren et al, "The Effect of Mn Concentration on the Photoluminescence of ZnS:Mn", J Phys. D: Appl. Phys. 16 (1983), pp. 225–232).

SUMMARY OF THE INVENTION

It is an object of the invention to provide thin film electroluminescent (TFEL) display panels by using ion implantation.

It is an object of the invention to provide multicolor TFEL display panels.

According to the invention, an EL layer is fabricated using ion implantation of dopants at selected locations in a host layer. By this method, stripes of EL material with different dopant ions can be precisely formed, and these different stripes can be addressed by separate electrodes in order to obtain a multicolor display panel.

These and other objects and features of the invention will be apparent from the following detailed description taken with reference to the accompanying drawings.

DRAWINGS

FIG. 4 is a schematic cross section of a multicolor TFEL display panel according to the invention.

DESCRIPTION OF THE PREFERRED EMBODIMENT

It has been discovered that dopants can be ion implanted into a host layer suitable for providing electroluminescence, and that these dopants can be restricted to definite patterns without significant lateral diffusion either before or during annealing of the host layer with its ion implanted dopants.

A Y$_2$O$_3$ dielectric layer was deposited on a glass substrate having a transparent electrode. A host layer of ZnS with a terbium fluoride dopant suitable for causing green electroluminescence was deposited on top of the dielectric layer. A photoresist pattern having 0.01 inch wide opening stripes was formed on the host layer using conventional lithographic techniques. The sample was then placed in an ion implantation chamber and implanted with Mn ions at a flux of $10^{16}$ ions per cm$^2$ using an accelerating voltage of 200 kV.

The sample was then removed from the chamber, stripped of its photoresist pattern, and annealed at 600° C. The annealing tends to convert the host material from an amorphous to a polycrystalline structure, redistributes the Mn implant, and remove defects created during implantation. As a result, more light can be obtained during electroluminescence.

Figure 1:
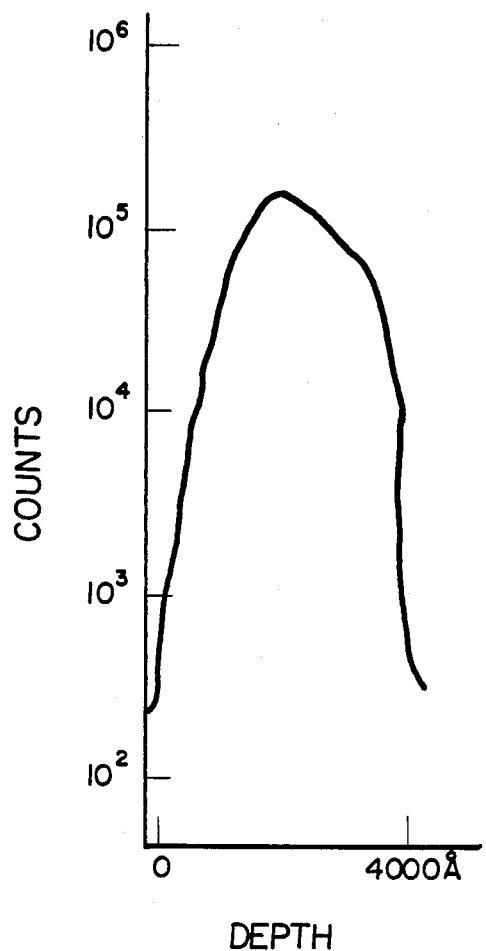
FIG. 1 is a depth profile showing the concentration of manganese in a host layer of ZnS.

FIG. 1 shows the concentration of Mn obtained in the Mn stripe based upon analysis by secondary ion mass spectrometry (SIM analysis). The vertical axis (counts) is proportional to the concentration of Mn, and the horizontal axis (depth) shows the location within the 4000A thick host layer.

Figure 2:
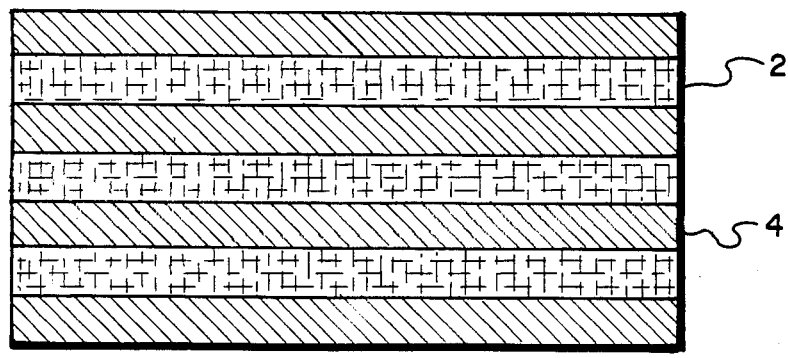
FIG. 2 is an enlarged view showing four green electroluminescent stripes and three yellow electroluminescent stripes created by ion implanting Mn in a ZnS:TbF$_3$ host layer.

FIG. 2 shows (at about 20x) the pattern of stripes which was obtained when a suitable voltage was applied across all the stripes in the sample. Each stripe was 0.01 inch wide. Yellow stripes 2 were formed by the ion implanted Mn dopant. Green stripes 4 are caused by electroluminescence of the ZnS:TbF$_3$ host layer which was protected from ion implantation by the photoresist pattern.

An important feature of the invention is the fact that sharp delineation was obtained between the two colored stripes. When examined under magnification, there was no evidence of mixing of the colors at the boundary. This indicates that there was no significant diffusion of the ion implanted Mn in the lateral direction despite the fact that the sample was annealed at 600° C. This means that ion implantation can be used to provide sharply defined stripes of color in a single host layer, and thereby provide a multicolor display.

Although no significant lateral diffusion was observed, it appears possible that there may have been some diffusion in the longitudinal direction (the direction of implantation) during the 600° C. anneal. This can be helpful in providing uniform distribution of the ion implanted dopant as shown in FIG. 1. Such differential diffusion may be caused by the preferred orientation of the host material.

Figure 3:
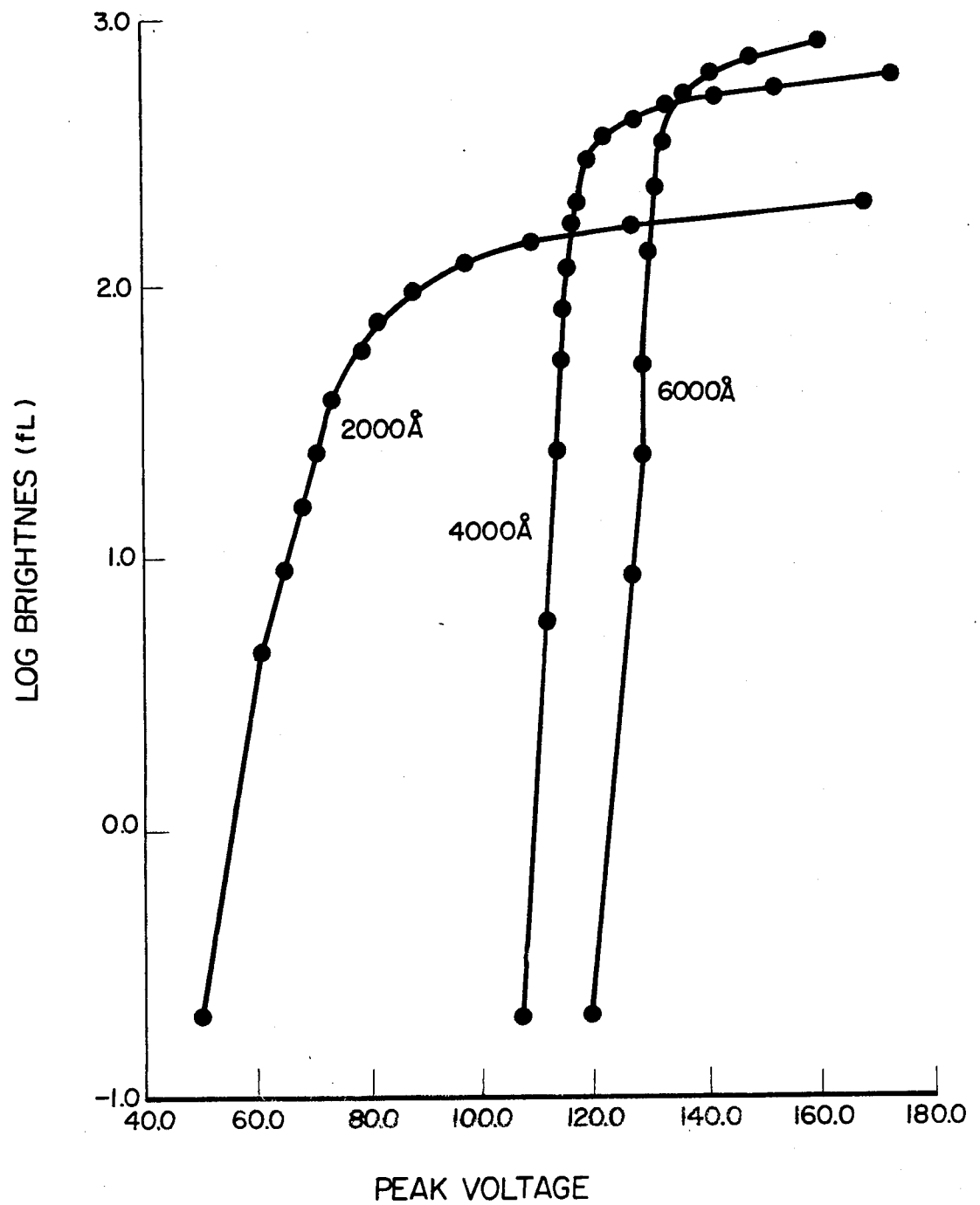
FIG. 3 is a plot of brightness vs voltage for three thicknesses of ZnS host material implanted with Mn at a flux of $10^{16}$ ions per cm$^2$.

FIG. 3 shows the brightness vs peak voltage for layers of three different thicknesses (2000A, 4000A, and 6000A) which were ion implanted with Mn at a flux of $10^{16}$ ions per cm$^2$. The 6000A thick layer gave the brightest results. Similar tests run at a flux of only $10^{15}$ ions per cm$^2$ showed a reduction in the intensity of brightness by a factor of about 2 ½.

FIG. 4 is an enlarged cross section of a multicolor TFEL display panel in accordance with the invention. Glass substrate 6 has a transparent electrode 8 of tin oxide or indium tin oxide as known in the art. Transparent electrode 8 is covered with insulating dielectric layer 10 such as Y$_2$O$_3$. Host layer 12 of ZnS or other suitable material is deposited on dielectric layer 10 using known methods such as electron beam evaporation or sputtering.

In the example shown in FIG. 4, three different ion implantations have been made in host layer 12 in order to provide three closely spaced primary colors. For example, stripe 14 is ion implanted with Eu to provide red electroluminescence (EL), stripe 16 is ion implanted with Tm or Ce to provide blue EL, and stripe 18 is implanted with Tb to provide green EL. Of course, other suitable dopants could be used.

After annealing, a second insulating dielectric layer 20 is deposited over the ion implanted host layer (or active layer), and back-side electrodes 22, 24, 26 are precisely formed directly above each ion implanted stripe. The backside electrodes are typically aluminum, and they can be deposited using photolithographic techniques such as used to define the ion implanted rows. Each electrode is separately addressed by means of known driver circuits as represented by contacts 28, 30. Transparent electrode 8 and backside electrodes 22, 24, 26 are formed in stripes which cross each other to create rows and columns whereby light emitting pixels are formed between the rows at the crossings.

When a suitable voltage is applied across the electrodes, light is emitted at the pixel created in the active layer between the electrode crossing. Electrode 8 can be a single, broad electrode at each pixel. However, to obtain full multicolor, each ion implanted stripe is separately addressed by its own individual electrode 22, 24, or 26.

As described by the above examples, thin film electroluminescent devices (TFEL) commonly have dielectric layers on both sides of the light-emitting (active) layer in order to improve stability. However, it is possible to fabricate such devices with a dielectric layer on only one side of the active layer. This invention is also applicable to such one-sided dielectric layer devices.

In some embodiments, the substrate which supports the thin active layer can be an opaque material rather than a transparent material. For example, the substrate can be an opaque semiconducting material having an integrated circuit thereon. In such cases, the surface opposite the substrate is provided with transparent electrodes (rather than on the substrate) in order to allow the emitted light to be viewed.

While the above examples are used to describe alternating current thin film electroluminescent (ACTFEL) devices, the invention can also be applied to direct current TFEL devices. Such D.C. devices do not require dielectric layers because of their D.C. nature.

Numerous variations can be made without departing from the invention. Accordingly, it should be understood that the form of the invention described above is illustrative and is not intended to limit the scope of the invention.

What is claimed is:

1. A method of fabricating an alternating current thin film electroluminescent display panel comprising the steps of:
   depositing a dielectric layer on a transparent substrate having a transparent electrode;
   depositing a host layer on said dielectric layer;
   ion implanting dopants into said host layer at a selected location to provide an electroluminescent at said location;
   annealing the ion-implanted host layer;
   depositing a second dielectric layer on said ion-implanted host layer; and
   forming a backside electrode on said second dielectric layer opposite said selected location.

2. The method as claimed in claim 1, including a step of photolithographically forming a pattern having an opening on said host layer whereby said selected location is defined by said opening; and a step of removing said pattern after implanting said dopant ions.

3. The method as claimed in claim 1 wherein said host layer comprises ZnS.

4. The method as claimed in claim 1 wherein said selected location comprises stripes on said host layer.

5. The method as claimed in claim 4, wherein said transparent and said backside electrodes are formed in stripes which cross each other to create rows and columns whereby light emitting pixels are formed between said rows at the crossings.

6. The method as claimed in claim 1, wherein said host layer is doped with a first dopant to provide a first color during electroluminescence and said selected location is implanted with a second dopant to provide a second color during electroluminescence, whereby a multicolor display panel is formed.

7. The method as claimed in claim 1 including the step of implanting second dopant ions in a second selected location, said second dopant ions providing a different color than said first mentioned dopant ions during luminescence, whereby a multicolor display panel is formed.

8. The method as claimed in claim 9 including the step of implanting third dopant ions in a third selected location, said third dopant ions providing a different color than said first mentioned and said second dopant ions during luminescence, whereby a multicolor display panel is formed.

9. A method of fabricating a direct current thin film electroluminescent display panel comprising the steps of:
   depositing a host layer on a transparent substrate having a transparent electrode;
   ion implanting dopants into said host layer at a selected location to provide an electroluminescent material at said location; and
   forming a backside electrode on said host layer at said selected location.

10. An electroluminescent display panel fabricated by the method as claimed in claim 1.

11. An electroluminescent display panel fabricated by the method as claimed in claim 9.

12. An electroluminescent display panel having an active layer with at least two closely spaced regions which have been ion implanted with different dopants to obtain different color electroluminescence, and electrode means for separately addressing each of said regions.

13. An electroluminescent display panel as claimed in claim 12 including dielectric layers on both sides of said active layer, whereby said electroluminescent display panel is an alternating current electroluminescent display panel.

14. An electroluminescent display panel as claimed in claim 12 including a transparent substrate having transparent electrodes.

15. An electroluminescent display panel as claimed in claim 12 including an opaque substrate, and wherein said electrode means comprises transparent electrode means on the side of said panel which is opposite said opaque substrate.

* * * * *